(12) United States Patent
Siegler et al.

(10) Patent No.: US 11,733,073 B2
(45) Date of Patent: Aug. 22, 2023

(54) PROTECTIVE DEVICE FOR A MEASURING APPARATUS

(71) Applicant: Hilti Aktiengesellschaft, Schaan (LI)

(72) Inventors: Ralf Siegler, Waldburg (DE); Ralph Lohner, Lindau (DE)

(73) Assignee: Hilti Aktiengesellschaft, Schaan (LI)

( * ) Notice: Subject to any disclaimer, the term of this patent is extended or adjusted under 35 U.S.C. 154(b) by 300 days.

(21) Appl. No.: 17/259,093

(22) PCT Filed: Jul. 1, 2019

(86) PCT No.: PCT/EP2019/067549
§ 371 (c)(1),
(2) Date: Jan. 8, 2021

(87) PCT Pub. No.: WO2020/011578
PCT Pub. Date: Jan. 16, 2020

(65) Prior Publication Data
US 2021/0318148 A1    Oct. 14, 2021

(30) Foreign Application Priority Data

Jul. 11, 2018 (EP) .................................... 18182811

(51) Int. Cl.
*G01D 11/24* (2006.01)
*F16F 9/04* (2006.01)
*F16M 11/32* (2006.01)
*G01C 15/00* (2006.01)

(52) U.S. Cl.
CPC ............ *G01D 11/245* (2013.01); *F16F 9/049* (2013.01); *F16F 9/0454* (2013.01); *F16M 11/32* (2013.01); *G01C 15/002* (2013.01)

(58) Field of Classification Search
CPC ..... G01D 11/245; G01C 15/002; F16F 9/049; F16M 11/32
See application file for complete search history.

(56) References Cited

FOREIGN PATENT DOCUMENTS

| CN | 108194805 A | * | 6/2018 | ................ F16F 9/04 |
| CN | 108194805 A |  | 6/2018 | |
| CN | 207848863 U | * | 9/2018 | ................ F16F 9/04 |
| CN | 108843717 A | * | 11/2018 | ............. F16F 9/029 |
| KR | 10-1474718 B1 |  | 12/2014 | |
| KR | 101474718 B1 | * | 12/2014 | |

OTHER PUBLICATIONS

PCT/EP2019/067549, International Search Report dated Oct. 4, 2019 (Two (2) pages).

* cited by examiner

*Primary Examiner* — Jamel E Williams
(74) *Attorney, Agent, or Firm* — Crowell & Moring LLP (57) ABSTRACT

A protective device for a measuring apparatus which can be arranged on a tripod includes a housing having a threaded hole and a threaded pin, where the threaded hole is disposed in a housing lower side of the housing and the threaded pin is disposed in a housing upper side of the housing. The protective device further includes an airbag and a filling device having at least one gas-filled gas container, a control device, and an energy source. A connecting line connects the airbag and the filling device for gas exchange. The airbag surrounds a cylindrical interior space in an inflated state.

12 Claims, 7 Drawing Sheets

PROTECTIVE DEVICE FOR A MEASURING APPARATUS

CROSS REFERENCE TO RELATED APPLICATIONS

This application claims the priority of International Application No. PCT/EP2019/067549, filed Jul. 1, 2019, and European Patent Document No. 18182811.2, filed Jul. 11, 2018, the disclosures of which are expressly incorporated by reference herein.

BACKGROUND AND SUMMARY OF THE INVENTION

The present invention relates to a protective device for a measuring apparatus.

Measuring apparatuses, such as total stations, laser scanners, 2-D layout devices and rotary laser levels are used inside and outside for leveling, marking and measuring tasks. Measuring apparatuses are generally secured on a tripod, which is set up inside or outside at the desired position. In this context, there can be accidents in which the measuring apparatus and the tripod tip over and fall onto the underlying surface or onto surrounding objects. Sensitive measuring apparatuses may be irreparably damaged. On the one hand, this gives rise to costs for the repair or replacement of the measuring apparatus and, furthermore, there is no measuring apparatus available until the measuring apparatus has been repaired or replaced.

To avoid damage to measuring apparatuses due to falls, protective devices with an airbag are known. KR 101474718 B1 discloses a protective device of this kind for a measuring apparatus designed as a total station. If the apparatus tips over, an airbag designed as a cushion is inflated, placing itself between the underlying surface and the measuring apparatus and thereby preventing a direct impact of the measuring apparatus on the underlying surface. The protective device is designed as a separate accessory, which is arranged between the measuring apparatus and the tripod. The protective device comprises a housing, four airbags, a filling device having a gas-filled gas container, a control device and an energy source as well as a connecting line, which connects the airbags to the filling device. The four airbags are arranged folded up in the housing of the protective device, wherein each of the four airbags is assigned to one angular region. With the aid of a sensor device, the tipping direction of the measuring apparatus and the associated airbag are determined. The gas container for filling the airbags is connected to the airbags via a line and is set up close to the tripod.

The protective device known from KR 10141741718 B1 for a measuring apparatus has the disadvantage that four airbags are required and the filling device is arranged outside the housing. This leads to a protective device which can hinder the user in operating the measuring apparatus, and the user can stumble over the gas container, which is set up next to the tripod, and cause the measuring apparatus to tip over. If the measuring apparatus is subject to an impact in the transitional region between two adjacent airbags, there is a risk that the measuring apparatus will tip or roll off the airbag and be damaged despite the protective device.

The object of the present invention is to develop a protective device for a measuring apparatus which is secured on a tripod. The protective device is intended to protect all the components of the measuring apparatus from damage. At the same time, the protective device should be of as compact design as possible and should hinder the user as little as possible, ideally not at all, in operating the measuring apparatus.

According to the invention, it is envisaged that the airbag surrounds a cylindrical interior space in the inflated state. The protective device according to the invention is used to protect measuring apparatuses which are secured on a tripod. Owing to the fact that the measuring apparatus is secured on a tripod, shocks to the tripod and/or the measuring apparatus lead to tipping over of the tripod. Generally, the entire arrangement comprising the tripod and the measuring apparatus tips over one tripod leg or two tripod legs, and the measuring apparatus approaches the underlying surface in an arc. The regions of the measuring apparatus which strike the underlying surface first can be easily identified and protected with the aid of the airbag.

The airbag is designed in such a way that, in the inflated state, it surrounds a cylindrical interior space in which the measuring apparatus is located. Since, when tipping over with the tripod, the measuring apparatus suffers the impact on its side, the airbag offers adequate protection. The airbag surrounds the measuring apparatus and distributes the energy introduced during the impact: during this process, as little as possible energy is transferred to the measuring apparatus. The cylindrical interior space can be composed of a plurality of cylindrical sections, and the shape of the cylindrical interior space is matched to the shape of the measuring apparatus.

The airbag preferably has a first stabilization chamber, an impact chamber and a second stabilization chamber, wherein the first stabilization chamber and the impact chamber are connected for gas exchange, and the impact chamber and the second stabilization chamber are connected for gas exchange. The term impact chamber is used to denote a chamber of the airbag via which energy is introduced on impact with an underlying surface, and the term stabilization chambers is used to denote chambers of the airbag which stabilize the shape of the airbag. During a tipover, energy is introduced via the impact chamber, and the energy introduced is then distributed and dissipated in the airbag. During this process, as little as possible energy is transferred to the measuring apparatus located in the cylindrical interior space of the airbag. The impact chamber is of annular design and protects the regions of the measuring apparatus which touch the underlying surface first during an impact by the measuring apparatus. The impact chamber is configured in such a way that it projects relative to the first stabilization chamber and relative to the second stabilization chamber on the outside of the airbag.

As a particular preference, the impact chamber has a ring width which is greater than a first width of the first stabilization chamber and greater than a second width of the second stabilization chamber. By means of the ring width of the impact chamber, it is possible to ensure that the impact chamber projects relative to the first stabilization chamber and relative to the second stabilization chamber on the outside of the airbag.

The first stabilization chamber preferably has a plurality of first subchambers, wherein adjacent first subchambers are connected for gas exchange. By means of the number and geometry of the first subchambers which form the first stabilization chamber, it is possible to influence how energy transfer of the energy introduced during the impact takes place in the airbag. During this process, as little as possible energy is transferred to the measuring apparatus located in the cylindrical interior space of the airbag.

The impact chamber preferably has a plurality of first impact subchambers, wherein adjacent first impact subchambers are connected for gas exchange. By means of the number and geometry of the first impact subchambers which form the impact chamber, it is possible to influence how energy transfer of the energy introduced during the impact takes place in the airbag. During this process, as little as possible energy is transferred to the measuring apparatus located in the cylindrical interior space of the airbag.

The second stabilization chamber preferably has a plurality of second subchambers, wherein adjacent second subchambers are connected for gas exchange. By means of the number and geometry of the second subchambers which form the second stabilization chamber, it is possible to influence how energy transfer of the energy introduced during the impact takes place in the airbag. During this process, as little as possible energy is transferred to the measuring apparatus located in the cylindrical interior space of the airbag.

The airbag preferably has a filling chamber, wherein the first stabilization chamber and the filling chamber are connected for gas exchange. The gas does not flow directly into the first stabilization chamber but flows initially into the filling chamber and, from there, into the first stabilization chamber. The filling chamber distributes the gas uniformly in the first stabilization chamber and bridges the path between the housing of the protective device and the first stabilization chamber of the airbag.

As a particular preference, the filling chamber has a plurality of subchambers. In order to accelerate the filling of the airbag with gas, the gas container can have a plurality of connecting lines, which connect the gas container to the subchambers of the filling chambers.

As a particular preference, the airbag additionally has a further impact chamber and a third stabilization chamber, wherein the second stabilization chamber and the further impact chamber are connected for gas exchange, and the further impact chamber and the third stabilization chamber are connected for gas exchange. In the case of large measuring apparatuses or measuring apparatuses with an irregular shape, an airbag with a further impact chamber and a third stabilization chamber offers the possibility of introducing the energy into the airbag during the impact via a plurality of impact chambers and distributing it more uniformly. The energy introduced into the impact chamber and the further impact chamber is distributed with the aid of the gas in the airbag.

As a particular preference, the further impact chamber has a plurality of second impact subchambers, wherein adjacent second impact subchambers are connected for gas exchange. By means of the number and geometry of the second impact subchambers which form the impact chamber, it is possible to influence how energy transfer of the energy introduced during the impact takes place in the airbag. During this process, as little as possible energy is transferred to the measuring apparatus located in the cylindrical interior space of the airbag.

As a particular preference, the third stabilization chamber has a plurality of third subchambers, wherein adjacent third subchambers are connected for gas exchange. By means of the number and geometry of the third subchambers which form the third stabilization chamber, it is possible to influence how energy transfer of the energy introduced during the impact takes place in the airbag. During this process, as little as possible energy is transferred to the measuring apparatus located in the cylindrical interior space of the airbag.

In a preferred embodiment, a valve, which can be switched between an open state and a closed state by the control device, is provided in the connecting line. The gas introduced into the airbag can escape slowly via the valve after the triggering of the airbag. As an alternative, the airbag can be emptied by removing the gas container from the protective device, thereby enabling the gas to escape more quickly from the airbag. The materials used for the airbag are generally not absolutely impermeable to gas, and a small portion of the gas can diffuse to the outside through the airbag.

Exemplary embodiments of the invention are described hereinafter with reference to the drawings. It is not necessarily intended for these to illustrate the exemplary embodiments to scale; instead, the drawings, where conducive to elucidation, are executed in schematic and/or slightly distorted form. It should be taken into account here that various modifications and alterations relating to the form and detail of an embodiment may be undertaken without departing from the general concept of the invention. The general concept of the invention is not limited to the exact form or the detail of the preferred embodiment shown and described hereinafter or limited to subject matter that would be limited compared to the subject matter claimed in the claims. For given design ranges, values within the limits mentioned shall also be disclosed as limiting values and shall be usable and claimable as desired. For the sake of simplicity, identical reference numerals are used hereinafter for identical or similar parts or parts having identical or similar function.

DETAILED DESCRIPTION OF THE DRAWINGS

Figure 1:
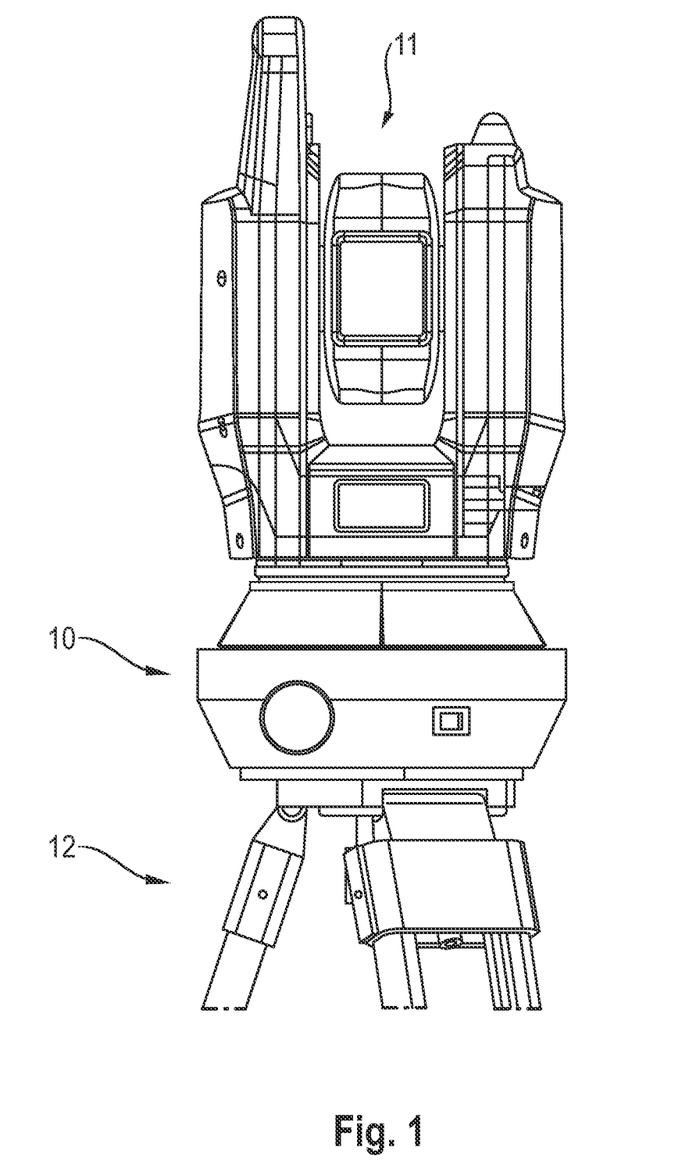
FIG. 1 shows a protective device, which is arranged between a measuring apparatus and a tripod.

FIG. 1 shows a protective device 10, which is arranged between a measuring apparatus 11 and a tripod 12. Normally, measuring apparatuses are secured directly on a tripod. For this purpose, measuring apparatuses have a standardized threaded hole, into which a standardized threaded pin of the tripod is screwed.

The term "measuring apparatus" includes all apparatuses for measurement of phenomena and properties that are not accessible. Examples of measuring apparatuses are total stations, laser scanners, 2-D layout devices and rotary laser levels.

Figure 2A:
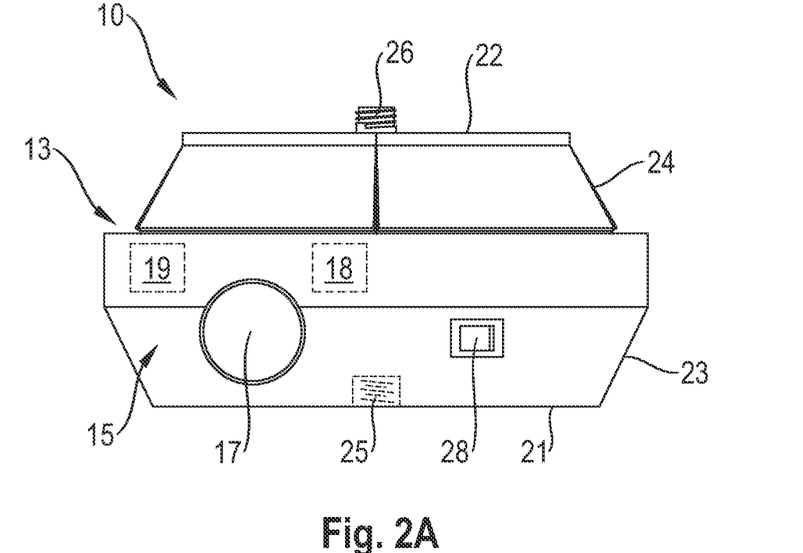
FIGS. 2A and 2B show the protective device of FIG. 1.
Figure 2B:
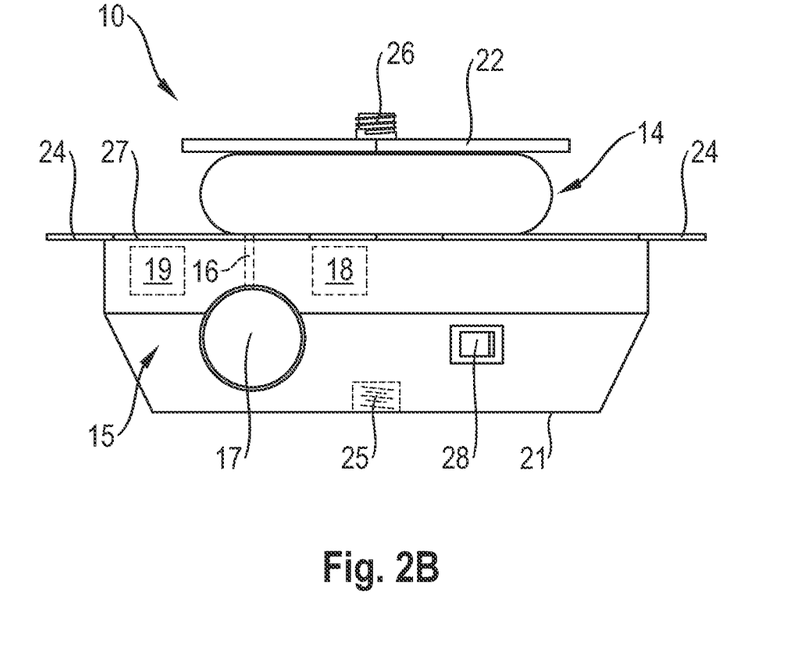

FIGS. 2A and 2B show the protective device 10 of FIG. 1. The protective device 10 comprises a housing 13, an airbag 14, a filling device 15 and a connecting line 16, which connects the airbag 14 and the filling device 15 to one another. The filling device 15 comprises a gas container 17, which is filled with a gas, a control device 18, which controls the filling device 15 and the connecting line 16, and an energy source 19, which supplies the energy required to inflate the airbag 14 by means of the filling device 15. The term "control device" includes all components which perform open-loop control, closed-loop control and/or monitoring of the operation of the protective device 10. The control device 18 comprises, for example, a microcontroller and an acceleration sensor, which detects the tipping of the measuring apparatus 11.

The housing 13 consists of a plurality of housing sections, which are designed as a housing lower side 21, as a housing upper side 22, as lower lateral surfaces 23 and as upper lateral surfaces 24. A threaded hole 25, which is screwed onto the threaded pin of the tripod 12, is provided in the housing lower side 21, and a threaded pin 26, onto which the threaded hole in the measuring apparatus 12 is screwed, is provided in the housing upper side 22. In order to make a distinction, the threaded hole 25 and the threaded pin 26 of the protective device 10 are denoted below as the first threaded hole and the first threaded pin, the threaded hole in the measuring apparatus 12 is denoted as the second threaded hole, and the threaded pin of the tripod is denoted as the second threaded pin.

The housing 13 is divided into a lower interior space and an upper interior space. The lower interior space is bounded by the housing lower side 21, the lower lateral surfaces 23 and a partition surface 27, and the upper interior space is bounded by the partition surface 27, the upper lateral surfaces 24 and the housing upper side 22. The lower interior space accommodates the filling device 15 with the gas container 17, the control de-vice 18 and the energy source 19. In the exemplary embodiment, the gas container 17 is inserted into the housing 13 from the outside and can simply be replaced with a new gas container; as an alternative, the gas container can be installed in a fixed manner in the housing. The upper interior space accommodates the airbag 14 in the folded state. The upper lateral surfaces 24 are designed as folding surfaces, which are folded out in use, thus enabling the airbag 14 to be inflated by means of the filling device 15. The protective device 10 can be switched on and off by means of a switch 28.

Figure 3A:
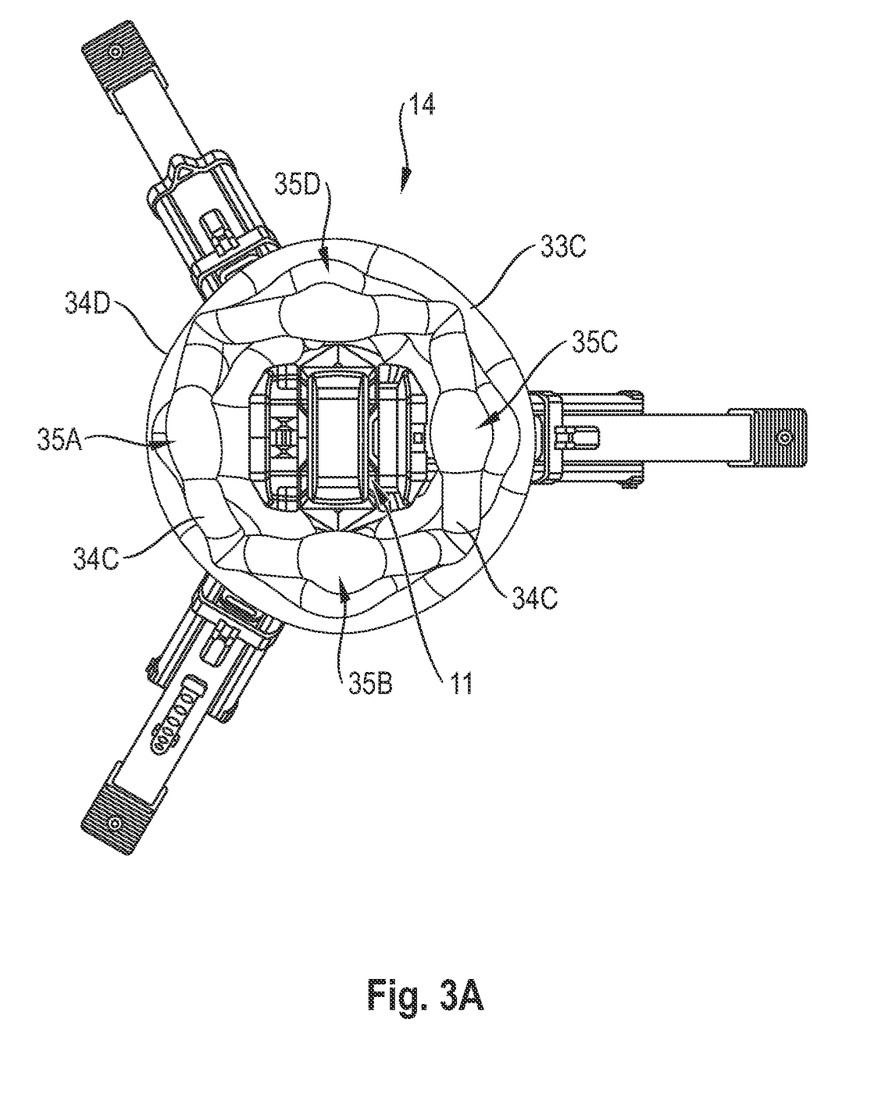
FIGS. 3A and 3B show the protective device of FIG. 1 with an inflated airbag in a view from above (FIG. 3A) and in a side view (FIG. 3B)
Figure 3B:
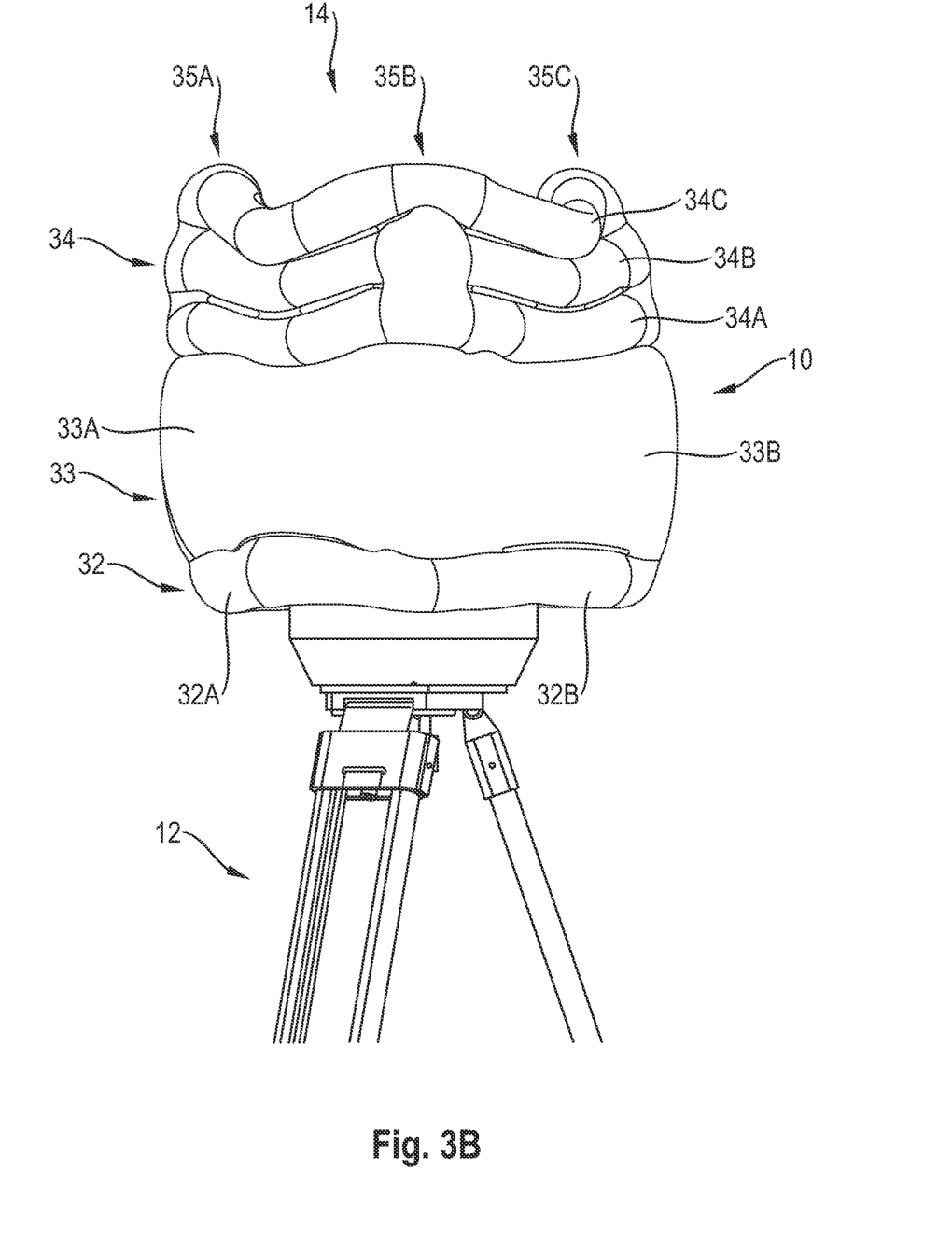

FIGS. 3A and 3B show the airbag 14 of the protective device 10 in the inflated state. In this case, FIG. 3A shows the airbag 14 in a view from above, and FIG. 3B shows the airbag 14 in a side view.

FIG. 3A shows the protective device 10, which is arranged between the measuring apparatus 11 and the tripod 12. The inflated airbag 14 of the protective device 10 surrounds a cylindrical interior space, in which the measuring apparatus 11 is arranged and protected from damage. The shape of the interior space is as far as possible matched to the external geometry of the measuring apparatus 11.

The airbag 14 comprises a plurality of annular chambers, which are designed as a first stabilization chamber 32, as an impact chamber 33 and as a second stabilization chamber 34. As the airbag 14 is filled, the gas flows into the first stabilization chamber 32 and, from there, into the impact chamber 33 and then into the second stabilization chamber 34. The first stabilization chamber 32 is connected to the impact chamber 33 for gas exchange, and the impact chamber 33 is connected to the second stabilization chamber 34 for gas exchange.

The term impact chamber is used to denote a chamber of the airbag 14 via which energy/force is introduced on impact with an underlying surface, and the term stabilization chambers is used to denote chambers of the airbag 14 which stabilize the shape of the airbag 14. In this context, a distinction is made between a first stabilization chamber and a second stabilization chamber. As the airbag 14 is filled, the first stabilization chamber is filled with gas at a time before the second stabilization chamber.

In constructing the airbag 14, consideration must be given to the tact that the airbag has to be fully inflated within a short time in order to protect the measuring apparatus 11 during a tipover. On the other hand, the airbag 14 must have a shape which distributes the energy introduced into the impact chamber 33 during the fall by equalizing the pressure via the gas in the airbag. The adaptation of the shape of the airbag 14 is accomplished by dividing the first stabilization chamber 32, the impact chamber 33 and/or the second stabilization chamber 34 into subchambers. The subdivision can be accomplished with the aid of tucks, for example, which reduce the cross-sectional area at the transition between adjacent subchambers.

In the exemplary embodiment, the first stabilization chamber 32 comprises four first subchambers 32A, 32B, 32C, 32D, wherein adjacent first subchambers are connected for gas exchange. In the exemplary embodiment, the impact chamber 33 comprises four impact subchambers 33A, 33B, 33C, 33D, wherein adjacent impact subchambers are connected for gas exchange. In the exemplary embodiment, the second stabilization chamber 34 comprises three second subchambers 34A, 34B, 34C, wherein adjacent second subchambers are connected for gas exchange. For their part, the second subchambers 34A, 34B, 34C can be divided again into second subchambers.

As the airbag 14 is filled, the gas flows into the first stabilization chamber 32 and, from there, into the impact chamber 33 and then into the second stabilization chamber 34. In order to allow rapid inflation of the airbag 14, the first stabilization chamber 32, the impact chamber 33 and the second stabilization chamber 34 are connected by connecting passages 35A, 35B, 35C, 35D. The cross-sectional area of the connecting passages is matched to the volume of the gas used.

The exemplary embodiment in FIGS. 3A and 3B shows an airbag having an impact chamber. As an alternative, the airbag can have two impact chambers or more than two impact chambers. The number of impact chambers which an airbag has depends on the size, the weight, the fall height and the shape of the measuring apparatus which is to be protected by the airbag.

Figure 4A:
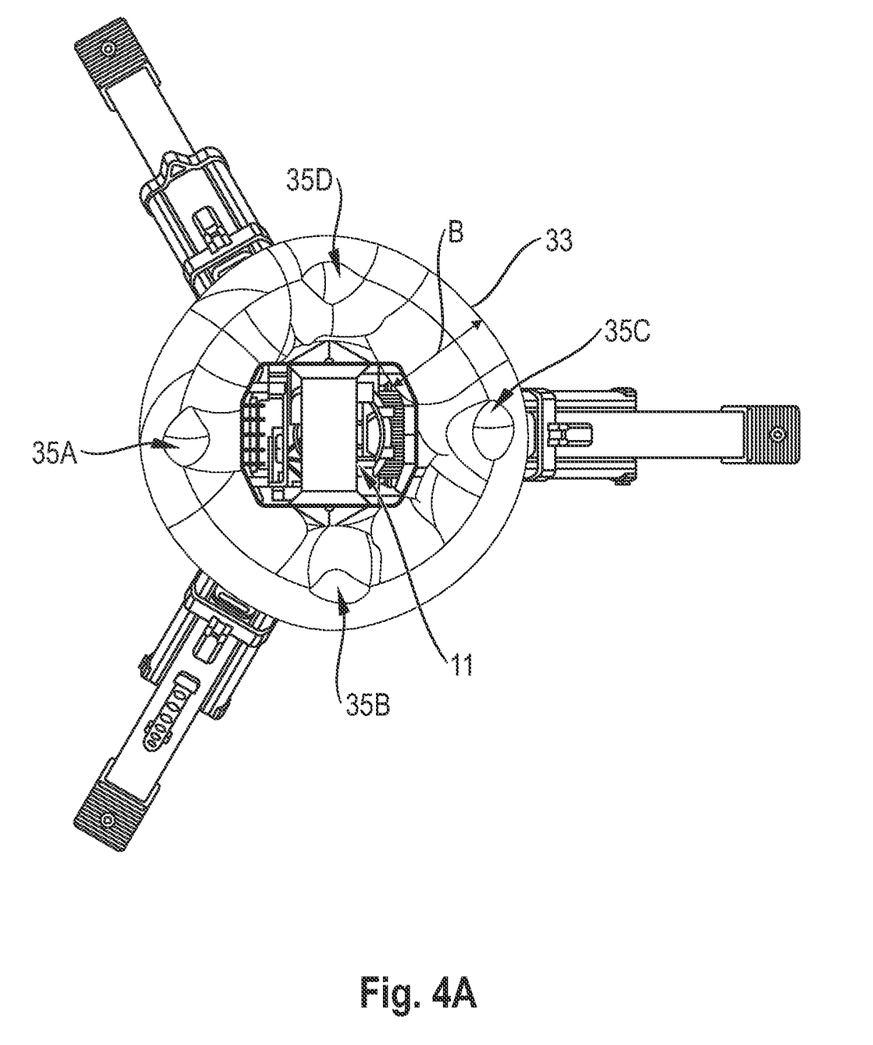
FIGS. 4A and 4B show the airbag of FIGS. 3A and 3B, which is constructed from a plurality of chambers, with the connection between a first stabilization chamber and an impact chamber (FIG. 4A) and the connection between the impact chamber and a second stabilization chamber 34 (FIG. 4B)
Figure 4B:
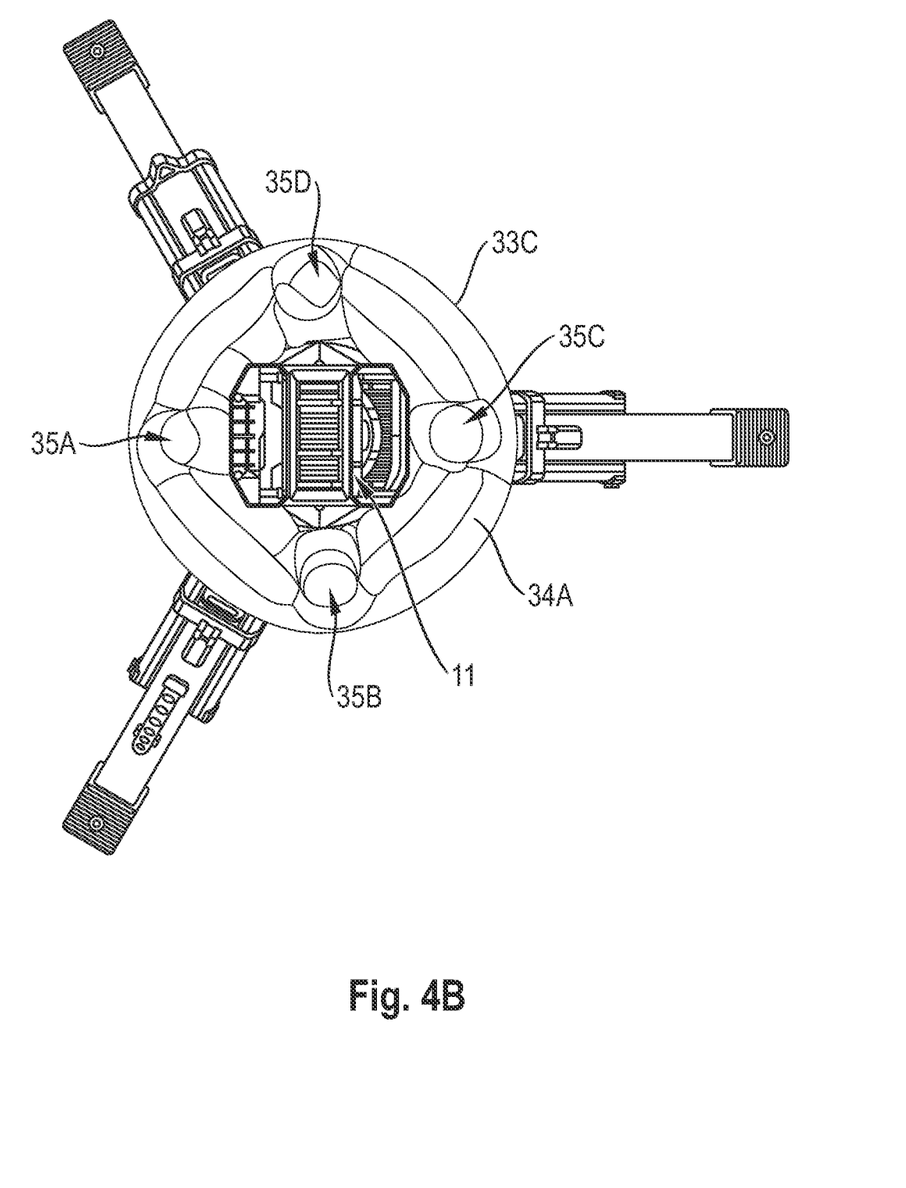

FIGS. 4A and 4B show the connection between the first stabilization chamber 32 and the impact chamber 33 (FIG. 4A) and the connection between the impact chamber 33 and the second stabilization chamber 34 (FIG. 4B).

The filling of the airbag 51 takes place via the connecting passages 35A, 35B, 35C, 35D, which connect the first stabilization chamber 32 and the impact chamber 33 and connect the impact chamber 33 and the second stabilization chamber 34. Moreover, the connecting passages 35A, 35B, 35C, 35D allow gas exchange between the impact chamber 33 and the first and second stabilization chambers 32, 34. The energy introduced via the impact chamber 33 during the impact is distributed via the gas in the air-bag 14.

Figure 5A:
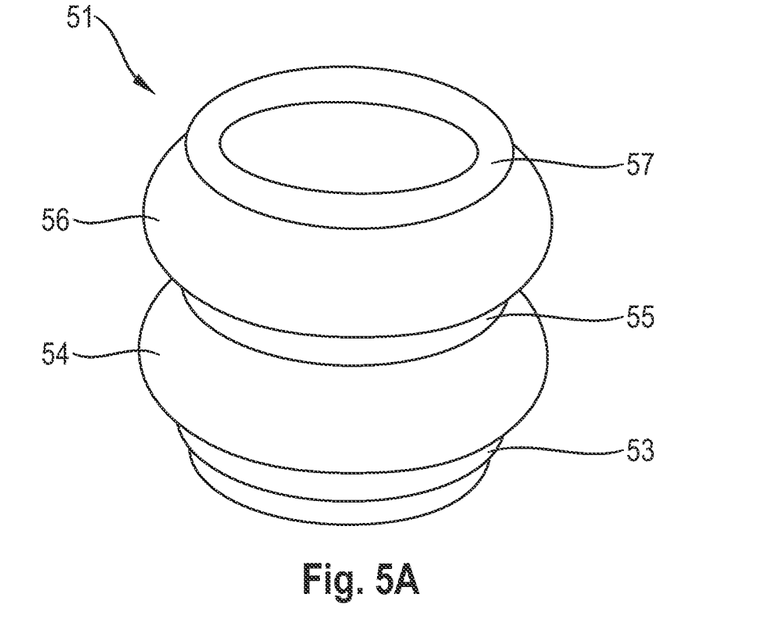
FIGS. 5A and 5B show an alternative airbag for the protective device of FIG. 1.
Figure 5B:
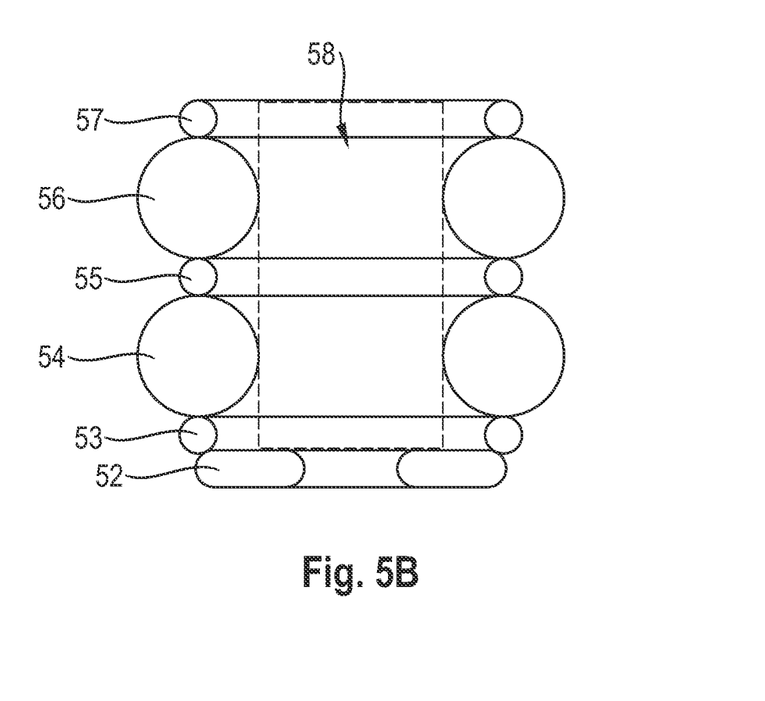

FIGS. 5A and 5B show an airbag 51 which can replace the airbag 14 in the protective device 10. The airbag 51 comprises a plurality of annular chambers, which are designed as a filling chamber 52, as a first stabilization chamber 53, as an impact chamber 54, as a second stabilization chamber 55, as a further impact chamber 56 and as a third stabilization chamber 57. In order to make a distinction, the impact chamber 54 is referred to as the first impact chamber, and the further impact chamber 56 is referred to as the second impact chamber. The airbag 51 surrounds a cylindrical interior space 58.

In the case of large measuring apparatuses or measuring apparatuses with an irregular shape, the airbag 51 with the impact chamber 54 and the further impact chamber 56 offers the possibility of introducing the energy into the airbag 51 during the impact via the two impact chambers 54, 56 and distributing it more uniformly in the airbag 51. The energy introduced into the impact chamber 54 and the further impact chamber 56 is distributed with the aid of the gas in the airbag 51. The first stabilization chamber 53, the second stabilization chamber 55 and the third stabilization chamber 57 serve to stabilize the airbag 51.

As the airbag 51 is filled, the gas initially flows out of the gas container 17 into the filling chamber 52, from there into the first stabilization chamber 53, from there into the impact chamber 54, from there into the second stabilization chamber 55, from there into the further impact chamber 56 and from there into the third stabilization chamber 57. The first stabilization chamber 53 is connected to the impact chamber 54 for gas ex-change, the impact chamber 54 is connected to the second stabilization chamber 55 for gas exchange, the second stabilization chamber 55 is connected to the further impact chamber 56 for gas exchange, and the further impact chamber 56 is connected to the third stabilization chamber 57 for gas exchange.

The invention claimed is:

1. A protective device for a measuring apparatus which can be arranged on a tripod, comprising:
   a housing having a threaded hole and a threaded pin, wherein the threaded hole is disposed in a housing lower side of the housing and the threaded pin is disposed in a housing upper side of the housing;
   an airbag;
   a filling device having at least one gas-filled gas container, a control device, and an energy source; and
   a connecting line which connects the airbag and the filling device for gas exchange;
   wherein the airbag surrounds a cylindrical interior space in an inflated state of the airbag;
   wherein the airbag has a first stabilization chamber, an impact chamber, and a second stabilization chamber, wherein the first stabilization chamber and the impact chamber are connected for gas exchange, and wherein the impact chamber and the second stabilization chamber are connected for gas exchange.

2. The protective device as claimed in claim 1, wherein the impact chamber has a ring width which is greater than a first width of the first stabilization chamber and is greater than a second width of the second stabilization chamber.

3. The protective device as claimed in claim 1, wherein the first stabilization chamber has a plurality of first subchambers and wherein adjacent first subchambers of the plurality of first subchambers are connected for gas exchange.

4. The protective device as claimed in claim 1, wherein the impact chamber has a plurality of first impact subchambers and wherein adjacent first impact subchambers of the plurality of first impact subchambers are connected for gas exchange.

5. The protective device as claimed in claim 1, wherein the second stabilization chamber has a plurality of second subchambers and wherein adjacent second subchambers of the plurality of second subchambers are connected for gas exchange.

6. The protective device as claimed in claim 1, wherein the airbag has a filling chamber and wherein the first stabilization chamber and the filling chamber are connected for gas exchange.

7. The protective device as claimed in claim 6, wherein the filling chamber has a plurality of subchambers.

8. The protective device as claimed in claim 1, wherein the airbag has a further impact chamber and a third stabilization chamber, wherein the second stabilization chamber and the further impact chamber are connected for gas exchange, and wherein the further impact chamber and the third stabilization chamber are connected for gas exchange.

9. The protective device as claimed in claim 8, wherein the further impact chamber has a plurality of second impact subchambers and wherein adjacent second impact subchambers of the plurality of second impact subchambers are connected for gas exchange.

10. The protective device as claimed in claim 8, wherein the third stabilization chamber has a plurality of third subchambers and wherein adjacent third subchambers of the plurality of third subchambers are connected for gas exchange.

11. The protective device as claimed in claim 1, wherein a valve is disposed in the connecting line and wherein the valve is switchable between an open state and a closed state by the control device.

12. The protective device as claimed in claim 1, wherein the impact chamber is configured such that the impact chamber projects relative to the first stabilization chamber and relative to the second stabilization chamber on an outside of the airbag.

* * * * *